(12) United States Patent
Mäkinen

(10) Patent No.: US 12,469,599 B2
(45) Date of Patent: Nov. 11, 2025

(54) WEARABLE DEVICE CHARGER WITH DISPLAY

(71) Applicant: Oura Health Oy, Oulu (FI)

(72) Inventor: Jukka Tapani Mäkinen, Oulu (FI)

(73) Assignee: Oura Health Oy, Oulu (FI)

( * ) Notice: Subject to any disclaimer, the term of this patent is extended or adjusted under 35 U.S.C. 154(b) by 151 days.

(21) Appl. No.: 18/390,286

(22) Filed: Dec. 20, 2023

(65) Prior Publication Data

US 2025/0210186 A1   Jun. 26, 2025

(51) Int. Cl.
*G08B 29/00* (2006.01)
*G16H 40/63* (2018.01)

(52) U.S. Cl.
CPC .................................. *G16H 40/63* (2018.01)

(58) Field of Classification Search
CPC ......... G06H 40/63; G01R 27/14; H02J 50/10; H02J 50/80; H02J 7/342; A61B 5/681; A61B 5/11
See application file for complete search history.

(56) References Cited

U.S. PATENT DOCUMENTS

| | | | |
|---|---|---|---|
| 9,685,802 B1* | 6/2017 | Mirov | H02J 7/0044 |
| 10,918,289 B1* | 2/2021 | Wasson | A61B 5/0022 |
| 11,599,147 B2* | 3/2023 | von Badinski | G08B 5/36 |
| 12,045,395 B2* | 7/2024 | Kim | G06F 3/013 |
| 12,322,990 B2* | 6/2025 | Sanchez | H02J 7/0047 |
| 2023/0147750 A1* | 5/2023 | Barker | A61B 5/11 600/301 |
| 2025/0028746 A1* | 1/2025 | Cantu | G06F 16/3329 |

* cited by examiner

*Primary Examiner* — Toan N Pham
(74) *Attorney, Agent, or Firm* — Holland & Hart LLP

(57) ABSTRACT

Methods, systems, and devices for displaying physiological data via a charger for a wearable device are described. For example, the charger may feature a display on a top surface of a charger post that may display the physiological data. In some examples, the display may feature one or more optical lenses that may project the user data (e.g., as a hologram above the charger or on a ceiling or wall of a room). The charger may receive the user data for projection to the user from the smart device or from the wearable ring device. In some examples, the charger may identify one or more triggers for displaying data (e.g., pre-configured triggers or triggers configured by the user). For example, the charger may display the data in response to satisfaction of the triggers, which may be based on the collected physiological data, the location of the user, or both.

20 Claims, 4 Drawing Sheets

WEARABLE DEVICE CHARGER WITH DISPLAY

FIELD OF TECHNOLOGY

The following relates to wearable devices and data processing, including a wearable device charger with a display.

BACKGROUND

Some wearable devices may be configured to collect data from users, including temperature data, heart rate data, and the like. The wearable devices may be paired with an application on a smart device to display the data. However, users may want to see the data without opening the application on the smart device.

DETAILED DESCRIPTION

In some examples, a wearable ring device may collect physiological data from a user, such as sleep data, heart rate data, respiration rate data, and the like. The wearable ring device may be paired with an application on a smart device (e.g., a smartphone) for the user to view the health data. However, in some examples, the user may not want to use the smart device to access such data. For example, using the smart device just before or after sleeping may decrease a quality of sleep and thus an overall health of the user. Additionally, the user may use some features of the application (e.g., breathing exercise features) to assist in meditation exercises, but the requirement that such features only be accessible through the smart device may decrease an overall user satisfaction. Therefore, a method for the user to access data and features of the application without use of the smart device may increase user experience.

Accordingly, a wearable ring device charger that may display user health data and application features is described. The described device charger may enable the user to view data collected via the wearable device without use of the smart device. For example, the charger may feature a display (e.g., a light emitting diode (LED) display, liquid crystal display (LCD), or organic LED (OLED) display) on a top surface of a charger post that may display the user data. Including a display within the charger device may enable the user to view health-related data without use of the smart device. In some cases, the charger may identify certain "trigger events" for displaying data to the user, where the respective trigger events cause the charger to display different health-related information. For example, when the user first wakes up, the charger may display a Sleep Score and a Readiness Score of the user. Comparatively, when the user completes a workout (as determined based on data collected from the ring), the charger may display an Activity Score or heart rate.

In the context of a charger for a wearable ring device, the ring charger may include a display (e.g., LED, LCD, or OLED display) on a top surface of a charger post. In some examples, the display includes one or more optical lenses that project information into the air or onto a surface (e.g., project a hologram above the charger, onto a wall/ceiling). For example, the charger may receive real-time respiration rate data from the ring, and may project images for a guided breathing session onto the user's ceiling to help the user fall asleep. In some cases, the charger may receive information that is to be displayed from the user device (e.g., smartphone) and/or directly from the wearable device.

Aspects of the disclosure are initially described in the context of systems supporting physiological data collection from users via wearable devices. Aspects of the disclosure are further illustrated by and described with reference to charging device diagrams.

Figure 1:
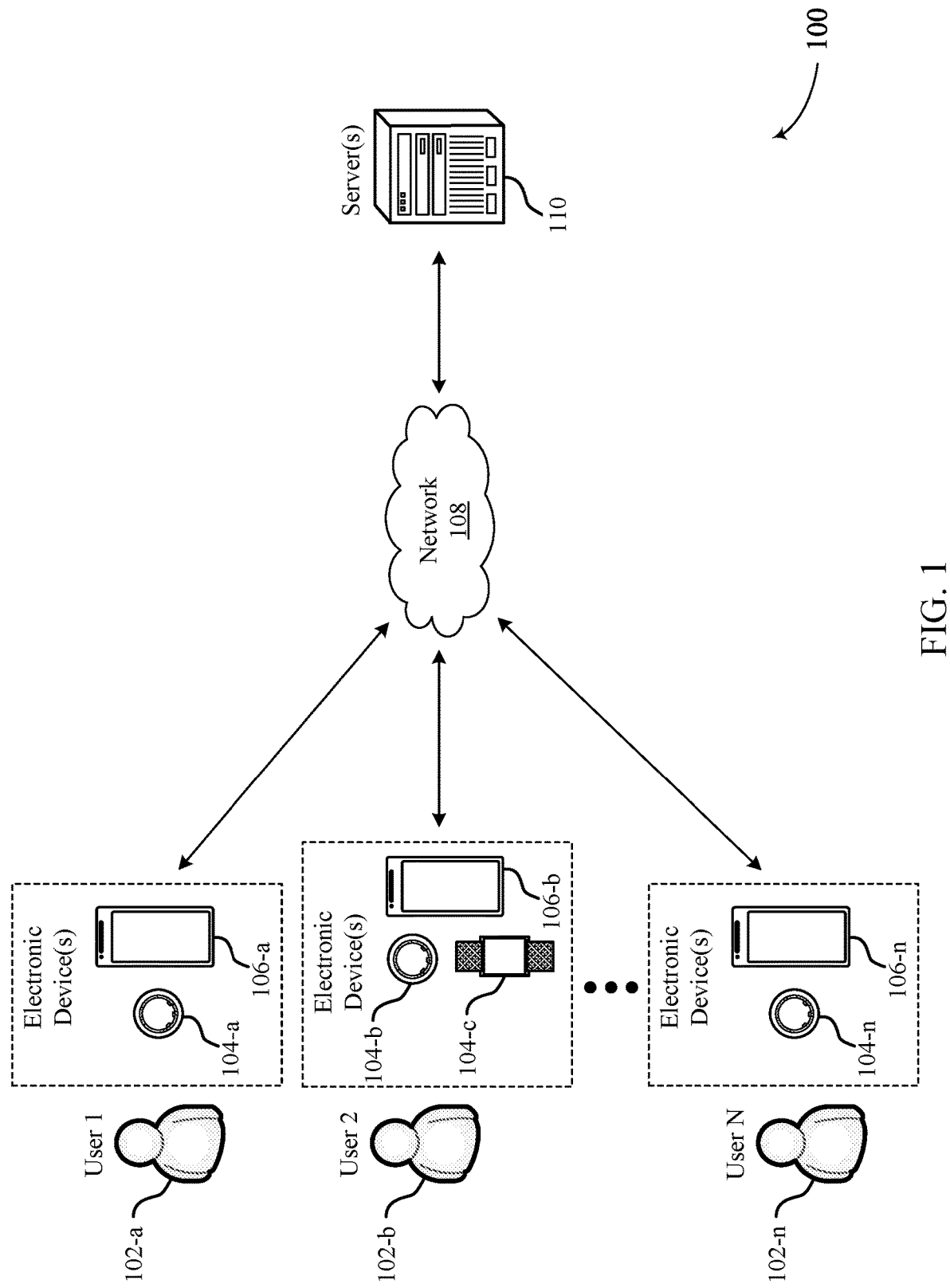
FIG. 1 illustrates an example of a system that supports a wearable device charger with a display in accordance with aspects of the present disclosure.

FIG. 1 illustrates an example of a system 100 that supports a wearable device charger with a display in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, blood oxygen saturation (SpO2), blood sugar levels (e.g., glucose metrics), and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-a (User 1) may operate, or may be associated with, a wearable device 104-a (e.g., ring 104-a) and a user device 106-a that may operate as described herein. In this example, the user device 106-a associated with user 102-a may process/store physiological parameters measured by the ring 104-a. Comparatively, a second user 102-b (User 2) may be associated with a ring 104-b, a watch wearable device 104-c (e.g., watch 104-c), and a user device 106-b, where the user device 106-b associated with user 102-b may process/store physiological parameters measured by the ring 104-b and/or the watch 104-c. Moreover, an nth user 102-n (User N) may be associated with an arrangement of electronic devices described herein (e.g., ring 104-n, user device 106-n). In some aspects, wearable devices 104 (e.g., rings 104, watches 104) and other electronic devices may be communicatively coupled to the user devices 106 of the respective users 102 via Bluetooth, Wi-Fi, and other wireless protocols. Moreover, in some cases, the wearable device 104 and the user device 106 may be included within (or make up) the same device. For example, in some cases, the wearable device 104 may be configured to execute an application associated with the wearable device 104, and may be configured to display data via a GUI.

In some implementations, the rings 104 (e.g., wearable devices 104) of the system 100 may be configured to collect physiological data from the respective users 102 based on arterial blood flow within the user's finger. In particular, a ring 104 May utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs) (e.g., vertical cavity surface-emitting lasers (VCSELs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-a associated with the first user 102-a may be communicatively coupled to the user device 106-a, where the user device 106-a is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-a may be associated with a wearable device 104-a (e.g., ring 104-a) and a user device 106-a. In this example, the ring 104-a may collect physiological data associated with the user 102-a, including temperature, heart rate, HRV, respiratory rate, and the like. In some aspects, data collected by the ring 104-a may be input to a machine learning classifier, where the machine learning classifier is configured to determine periods of time that the user 102-a is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-a via a GUI of the user device 106-a. Sleep stage classification may be used to provide feedback to a user 102-a regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-a via the wearable device 104-a. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g., in a hypothetical culture with 12 day "weeks," 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support a charger for a wearable ring device 104 that may display user health data and application features. The described charger may enable the user to view the data without use of a smart device 106. For example, the charger may feature a display (e.g., an LED, LCD, or OLED display) on a top surface of a charger post that may display the user data. In some examples, the display may feature one or more optical lenses that may project the user data (e.g., as a hologram above the charger or on a ceiling or wall of a room). The charger may receive the user data or application feature data for projection to the user from the smart device 106 or from the wearable ring device 104 (e.g., in real-time via Bluetooth). In some examples, the charger may identify one or more trigger conditions for displaying certain data (e.g., pre-configured trigger conditions or trigger conditions configured by the user). For example, the charger may be configured to begin displaying Sleep Score data upon detecting that the user has awoken.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
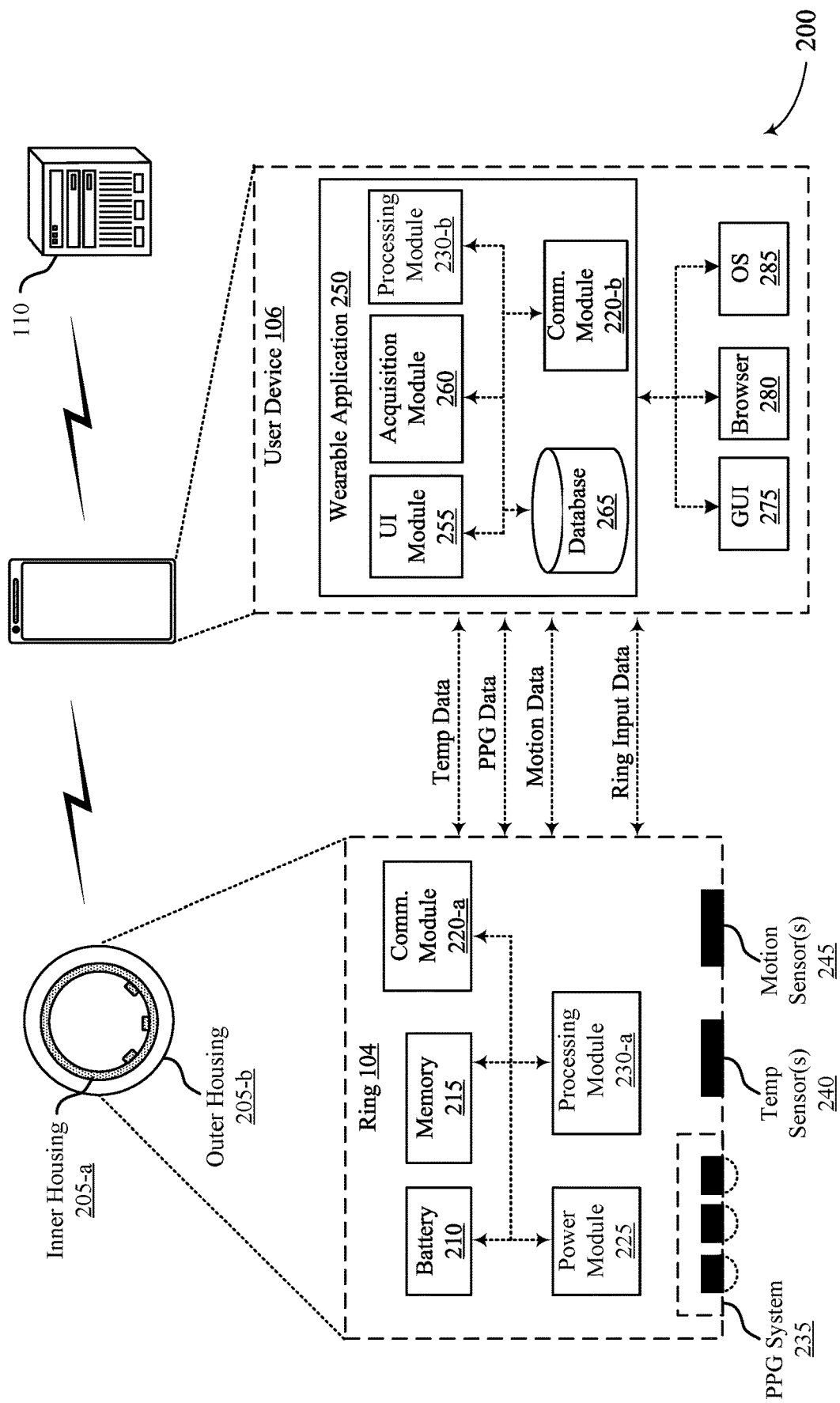
FIG. 2 illustrates an example of a system that supports a wearable device charger with a display in accordance with aspects of the present disclosure.

FIG. 2 illustrates an example of a system 200 that supports a wearable device charger with a display in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels (SpO2), blood sugar levels (e.g., glucose metrics), and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-a and an outer housing 205-b. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-a, a memory 215, a communication module 220-a, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using adhesives, wraps, clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate (s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG light emitting diodes (LEDs). In some implementations, the inner housing 205-a component may be molded onto the outer housing 205-b. For example, the inner housing 205-a may include a polymer that is molded (e.g., injection molded) to fit into an outer housing 205-b metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-a may communicate with the memory 215. The memory 215 may include computer-readable instructions that, when executed by the processing module 230-a, cause the processing module 230-a to perform the various functions attributed to the processing module 230-a herein. In some implementations, the processing module 230-a (e.g., a microcontroller) may include additional features associated with other modules, such as communication functionality provided by the communication module 220-a (e.g., an integrated Bluetooth Low Energy transceiver) and/or additional onboard memory 215.

The communication module 220-a may include circuits that provide wireless and/or wired communication with the user device 106 (e.g., communication module 220-b of the user device 106) or a communication module 220 associated with a charger of the ring 104. In some implementations, the communication modules 220-a, 220-b, or the communication module 220 of the charger may include wireless communication circuits, such as Bluetooth circuits and/or Wi-Fi circuits. In some implementations, the communication modules 220-a, 220-b, or the communication module 220 of the charger can include wired communication circuits, such as Universal Serial Bus (USB) communication circuits. Using the communication module 220-a, the ring 104 and the user device 106 (e.g., and the charger) may be configured to communicate with each other. The processing module 230-a of the ring may be configured to transmit/receive data to/from the user device 106 or the charger via the communication module 220-a. Example data may include, but is not limited to, motion data, temperature data, pulse waveforms, heart rate data, HRV data, PPG data, and status updates (e.g., charging status, battery charge level, and/or ring 104 configuration settings). The processing module 230-a of the ring (e.g., and a processing module of the charger) may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during charging, and under voltage during discharge. The power module 225 may also include electro-static discharge (ESD) protection.

The one or more temperature sensors 240 may be electrically coupled to the processing module 230-a. The temperature sensor 240 may be configured to generate a temperature signal (e.g., temperature data) that indicates a temperature read or sensed by the temperature sensor 240. The processing module 230-a may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-*a*) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-*a* may use to determine the temperature. As another example, in cases where the temperature sensor 240 includes a passive sensor, the processing module 230-*a* (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-*a* may sample the user's temperature over time. For example, the processing module 230-*a* may sample the user's temperature according to a sampling rate. An example sampling rate may include one sample per second, although the processing module 230-*a* may be configured to sample the temperature signal at other sampling rates that are higher or lower than one sample per second. In some implementations, the processing module 230-*a* may sample the user's temperature continuously throughout the day and night. Sampling at a sufficient rate (e.g., one sample per second) throughout the day may provide sufficient temperature data for analysis described herein.

The processing module 230-*a* may store the sampled temperature data in memory 215. In some implementations, the processing module 230-*a* may process the sampled temperature data. For example, the processing module 230-*a* may determine average temperature values over a period of time. In one example, the processing module 230-*a* may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-*a* near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-*a* may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-*a* may sample the sensors at different rates and average/store different values for the different sensors. In some implementations, the processing module 230-*a* may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-*a* may sample the PPG signal and determine a user's pulse waveform based on the PPG signal. The processing module 230-*a* may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-a may control one or both of the optical transmitters to transmit light while sampling the PPG signal generated by the optical receiver. In some implementations, the processing module 230-a may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-a may store the pulse waveform in memory 215 in some implementations. The processing module 230-a may process the pulse waveform as it is generated and/or from memory 215 to determine user physiological parameters described herein.

The processing module 230-a may determine the user's heart rate based on the pulse waveform. For example, the processing module 230-a may determine heart rate (e.g., in beats per minute) based on the time between peaks in the pulse waveform. The time between peaks may be referred to as an interbeat interval (IBI). The processing module 230-a may store the determined heart rate values and IBI values in memory 215.

The processing module 230-a may determine HRV over time. For example, the processing module 230-a may determine HRV based on the variation in the IBIs. The processing module 230-a may store the HRV values over time in the memory 215. Moreover, the processing module 230-a may determine the user's respiratory rate over time. For example, the processing module 230-a may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-a may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BMI160 inertial micro electro-mechanical system (MEMS) sensor that may measure angular rates and accelerations in three perpendicular axes.

The processing module 230-a may sample the motion signals at a sampling rate (e.g., 50 Hz) and determine the motion of the ring 104 based on the sampled motion signals. For example, the processing module 230-a may sample acceleration signals to determine acceleration of the ring 104. As another example, the processing module 230-a may sample a gyro signal to determine angular motion. In some implementations, the processing module 230-a may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-a may compress the data stored in memory 215. For example, the processing module 230-a may delete sampled data after making calculations based on the sampled data. As another example, the processing module 230-a may average data over longer periods of time in order to reduce the number of stored values. In a specific example, if average temperatures for a user over one minute are stored in memory 215, the processing module 230-a may calculate average temperatures over a five minute time period for storage, and then subsequently erase the one minute average temperature data. The processing module 230-a may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-b, a communication module 220-b, and a storage module (e.g., database 265) configured to store application data.

In some cases, the wearable device 104 and the user device 106 may be included within (or make up) the same device. For example, in some cases, the wearable device 104 may be configured to execute the wearable application 250, and may be configured to display data via the GUI 275.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support a charger for a wearable ring device 104 that may display user health data and application features. The described charger may enable the user to view the data without use of a smart device 106. For example, the charger may feature a display (e.g., an LED, LCD, or OLED display) on a top surface of a charger post that may display the user data. In some examples, the display may feature one or more optical lenses that may project the user data (e.g., a three-dimensional display, such as a hologram or a multiscopic display above the charger or on a ceiling or wall of a room). The charger may receive the user data or application feature data for projection to the user from the smart device 106 or from the wearable ring device 104 (e.g., in real-time via Bluetooth). In some examples, the charger may identify one or more trigger conditions for displaying certain data (e.g., pre-configured trigger conditions or trigger conditions configured by the user). For example, the charger may be configured to begin displaying Sleep Score data upon detecting that the user has awoken. In some examples, the charger may be configured to begin displaying data (e.g., heart rate, Sleep Score data, Readiness Score data, and so on) upon receiving a request from the user (e.g., via the application). In some examples, the charger may be configured to sequentially display one or more types of data. For example, the charger may display the Sleep Score data for a duration, then display the Readiness Score data for a duration, and so on. In such cases, the user may be able to control the order in which information is displayed by the charger, how long the respective data is displayed, etc.

Figure 3:
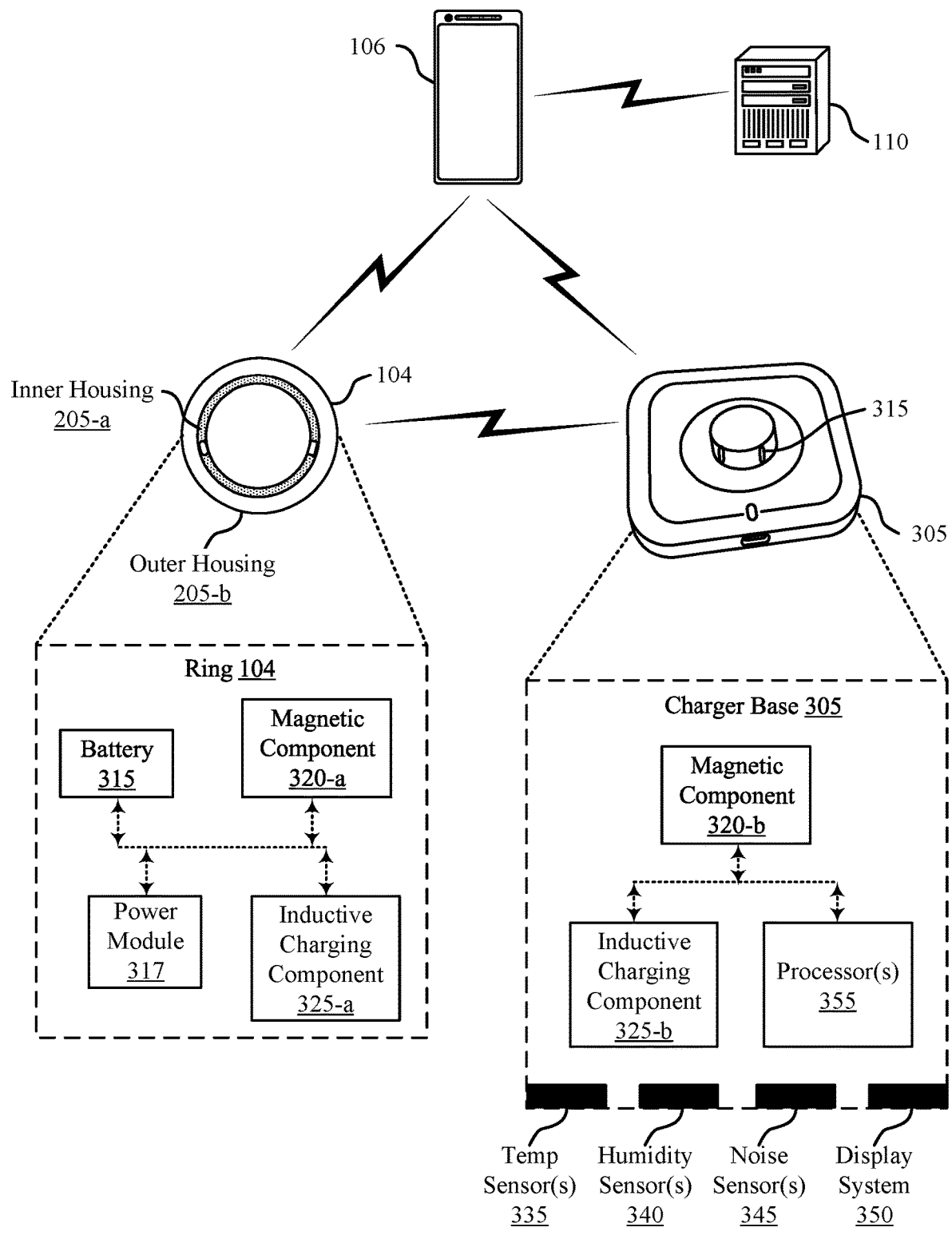
FIG. 3 shows an example of a system that supports a wearable device charger with a display in accordance with aspects of the present disclosure.

FIG. 3 shows an example of a system 300 that supports a wearable device charger with a display in accordance with aspects of the present disclosure. The system 300 may implement, or be implemented by system 100, system 200, or both. In particular, system 300 illustrates an example of a ring 104 (e.g., wearable device 104), as described with reference to FIGS. 1 and 2, and a charger base 305.

In some aspects, the ring 104 may be configured to be worn around a user's finger and may measure one or more user physiological parameters when worn around the user's finger. Example measurements and determinations may include, but are not limited to, user skin temperature, pulse waveforms, respiratory rate, heart rate, HRV, blood oxygen levels, and the like.

The system 300 further includes a charger base 305. The ring 104 may be in wireless and/or wired communication with a user device 106 and/or server 110. Similarly, the charger base 305 may be in wireless and/or wired communication with a user device 106, the ring 104, a server 110, or any combination thereof. In some implementations, the charger base 305 may send measured and processed data (e.g., temperature data, humidity data, noise data, and the like) to the user device 106, the ring 104, or both. Various data processing procedures described herein may be performed by any of the components of system 300, including the ring 104, charger base 305, user device 106, server 110, or any combination thereof. In this regard, the charger base 305 (e.g., charger device) may include one or more processors 355. As will be described in further detail herein, the one or more processors 355 of the charger base 305 may be configured to evaluate physiological data collected from the ring 104 in order to identify satisfaction of trigger conditions used to trigger the display system 350 to display different types of data/information.

Data may be collected and analyzed via one or more components of the system 300. Moreover, in some implementations, the charger base 305 may be configured to collect and analyze data, including ambient temperature data, noise data, and the like. For example, the user device 106 may determine a correlation between sleep data from the ring 104 and the measured and processed data from the charger base 305 (e.g., if the air temperature is relatively high, a user of the ring 104 may wake up throughout a sleep duration). In other words, data collected via the charger base 305 (e.g., ambient air temperature data, noise data) may be used to further analyze physiological data collected via the ring 104, and identify relationships between the user's physiological data and their surrounding environment (e.g., how the user's surroundings affect their physiological data).

The ring 104 may include an inner housing 205-a and an outer housing 205-b, as described with reference to FIG. 2. In some aspects, the housing 205 of the ring 104 may store or otherwise include various components of the ring 104 including, but not limited to, device electronics (e.g., a power module 317, which may be an example of a power module 225 as described with reference to FIG. 2), a power source (e.g., battery 312, which may be an example of a battery 210 as described with reference to FIG. 2, and/or capacitor), one or more substrates (e.g., printable circuit boards) that interconnect the device electronics and/or power source, and the like. In some examples, the housing 205 may also store a magnetic component 320-a (e.g., ferrite tape, other charging magnet, a transmitter coil, a rare earth magnet, or the like) and an inductive charging component 325 (e.g., inductive charging component 325-a).

The ring 104 shown and described with reference to FIGS. 2 and 3 is provided solely for illustrative purposes. As such, the ring 104 may include additional or alternative components as those illustrated in FIGS. 2 and 3. Other rings 104 that provide functionality described herein may be fabricated. For example, rings 104 with fewer components (e.g., sensors) may be fabricated. In a specific example, a ring 104 may include ferrite tape, which may act as both the magnetic component 320-a and the inductive charging component 325-a. In other cases, the ring 104 may include a dedicated charger magnet. For example, the ring 104 may include a metal plate and/or ferrite tape disposed proximate to a charger magnet.

In some cases, the ring 104 may be in electronic communication with the charger base 305. The charger base 305 may charge the battery 312 of the ring 104. The charger base 305 may include a support, which may store or otherwise include various components of the charger base 305. In some aspects, the support of the charger base 305 may store or otherwise include various components of the charger base 305 including, but not limited to, a magnetic component 320-b (e.g., ferrite tape, a transmitter coil, a rare earth magnet, or the like) and an inductive charging component 325-b.

In some cases, the magnetic component 320-b of the charger base 305 may include multiple magnets arranged according to a pattern based on a polarity of each magnet. For example, each magnet may have a polarity facing outward towards the surface of the charger base 305 to attract the magnetic component 320-a of the ring 104 with an opposite polarity. The charging component 325-b of the charger base 305 (e.g., transmitter coil, ferrite tape) may couple with charging component 325-a of the ring 104 (e.g., receiver coil, ferrite tape) to charge the battery 312 of the ring 104. In some examples, the charging component 325-a and the charging component 325-b may support charging of the battery 312 via direct electrical coupling (e.g., of contacts at the surface of the charger base 305 and the ring 104). Additionally, or alternatively, the charging component 325-a and the charging component 325-b may be examples of inductive charging components, which may support charging of the battery 312 via indirect electrical coupling. Inductive charging may also be referred to as wireless charging and may allow power to transfer from the charger base 305 to the battery 312 of the ring 104 using electromagnetic induction.

In some cases, the ring 104 may be configured to fit around a support 315 (e.g., charging post) of the charger base 305, where the magnetic components 320-a, 320-b are configured to align the ring 104 in the correct radial orientation for charging. That is, the magnetic components 320 may be configured to align the inductive charging components 325 to facilitate inductive charging for the ring.

In some examples, the charger base 305 may include one or more temperature sensors 335. The temperature sensors 335 may measure an average air temperature over a duration, may continuously measure air temperature, or both. Similarly, the charger base 305 may include one or more humidity sensors 340. The humidity sensors 340 may measure an average humidity level over a duration, may continuously measure humidity level, or both. The humidity sensors 340 may measure the humidity as a percentage (e.g., 35% humidity). The charger base 305 may include one or more noise sensors 345. The noise sensors 345 may measure a noise level (e.g., in decibels) averaged over a duration, continuously, or both. The charger base 305 may store the humidity measurements, the temperature measurements, the noise measurements, or a combination thereof.

The charger base 305 may include any type of sensor known in the art and may be configured to collect any type of data which may be used to provide insight into a user's environment and overall health. For example, the charger base 305 may include light sensors configured to measure an amount of light and/or type of light (e.g., wavelength). In such cases, the system 300 may be configured to determine whether light levels and/or which types of light may result positively or negatively affect a user's sleep and health (e.g., determine if blue light is more disruptive to a user's sleep as compared to red light). By way of another example, the charger base 305 may include air quality sensors configured to measure air quality, pollutants, allergens, and the like. Data collected via sensors of the charger base 305 may be leveraged to determine how a user's surrounding environment may affect their physiological data, sleep, and overall health. A processing module, such as a processing module 230 as described with reference to FIG. 2, at the user device 106 or at the charger base 305 may process the data from the temperature sensors 335, the humidity sensors 340, the noise sensors 345, light sensors, air quality sensors, or a combination thereof.

In some examples, the user device 106 and/or charger base 305 may process the data from the temperature sensors 335, the humidity sensors 340, the noise sensors 345, or a combination thereof in conjunction with data from the ring 104. For example, the user device 106 may receive physiological data collected by the ring 104 which reflects one or more sleep cycles of a user and may use the data from the sensors at the charger base 305 to determine a correlation between the collected physiological data and data collected by the charger base 305. For example, the user device 106 may determine a correlation over a time interval between data collected by the charger base 305 (e.g., ambient temperature data, humidity data, noise data, and the like) with a quality of sleep for the user (as determined by collected physiological data). In other words, the system 300 may be configured to identify whether high/low temperature, humidity, and/or noise levels result in a disruption of the user's sleep cycles (e.g., low ambient temperature and humidity levels result in higher quality sleep, higher noise levels result in lower quality sleep).

Although the charger base 305 is illustrated as including temperature sensors 335, humidity sensors 340, and noise sensors 345, the charger base 305 may include any quantity and type of sensors in one or more locations. For example, the charger base 305 may also include a motion sensor, a light sensor, or the like.

In some implementations, the charger base 305 may include a wired or wireless power source. For example, in some cases, the charger base 305 may be coupled with an electrical outlet or other power source. In other cases, the charger base 305 may include a battery or other internal power source to enable mobile charging of the ring 104. For example, in some implementations, the charger base 305 may include a battery or other internal power source such that a user may physically wear or carry the charger along with the ring 104 for mobile charging. For instance, the charger base 305 may be worn on a necklace so that a user may wear the charger while simultaneously charging the ring 104. In other cases, the charger base 305 may be coupled with the ring 104 (e.g., magnetically coupled, mechanically snapped onto) the ring 104 while the ring 104 is being worn so that the ring 104 may be charged (and continue to collect physiological data) as it is worn.

In some cases, the charger base 305 may include a display system 350. The display system 350 may display one or more indications to a user of the ring 104 (e.g., via one or more LEDs, OLEDs, or an LCD). For example, the display system 350 may display a battery level of the battery 312, a battery health/charge status (e.g., end of battery life), a time of day, connectivity issues, the physiological data of the user (e.g., temperature, heart rate, breathing rate, or the like), or one or more scores of the user (e.g., a Sleep Score related to how well a user slept, a Readiness Score or level, an Activity Score or level, or the like). That is, the charger base 305 may be configured to receive the physiological data or the one or more scores of the user (e.g., from the smart device 106 or the ring 104 via a communication module, as described with reference to FIG. 2).

The charger base 305 may be configured to display the physiological data or the one or more scores of the user in response to a prompt or a command from the user. For example, the user may input (e.g., via an application of the user device 106) one or more trigger conditions for the charger base 305 to begin to display the physiological data.

The one or more trigger conditions may include, for example, the user waking up, the user beginning to exercise, the user placing the ring 104 on the charger base 305, a time of day, etc. In some examples, the user may trigger the display system 350 to begin to display one or more application features (e.g., breathing exercises or meditation features) via the application of the smart phone. The charger base 305 may receive a command to being displaying the physiological data, scores, or application features from the ring 104 or the user device 106 in response to the one or more triggers (e.g., via a communication module, as described with reference to FIG. 2).

Additionally, or alternatively, the display system 350 may display one or more alerts to the user (e.g., action items prompting the user to perform an action, and the like). In some examples, the display system 350 may display a battery level of the battery 312 of the ring 104 as a percentage of total battery by displaying the numbers of the percentage, by illuminating a portion of LEDs (e.g., if a battery level is at 50%, 5 of 10 LEDs may be displayed), or the like. The LEDs in the display system 350 may be oriented in any arrangement on the charger base 305, may be any color combination (e.g., red LED, blue LED, green LED), and there may be any quantity of LEDs in the display system 350.

Figure 4A:
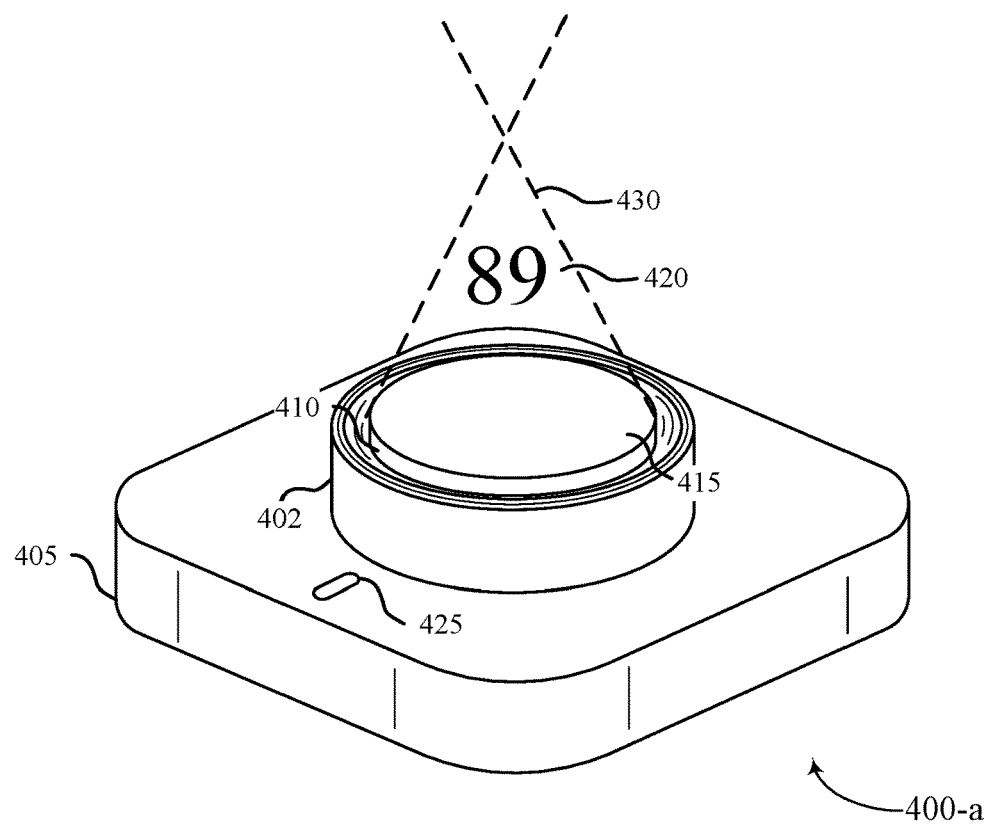
FIGS. 4A and 4B show examples of charging diagrams that support a wearable device charger with a display in accordance with aspects of the present disclosure.
Figure 4B:
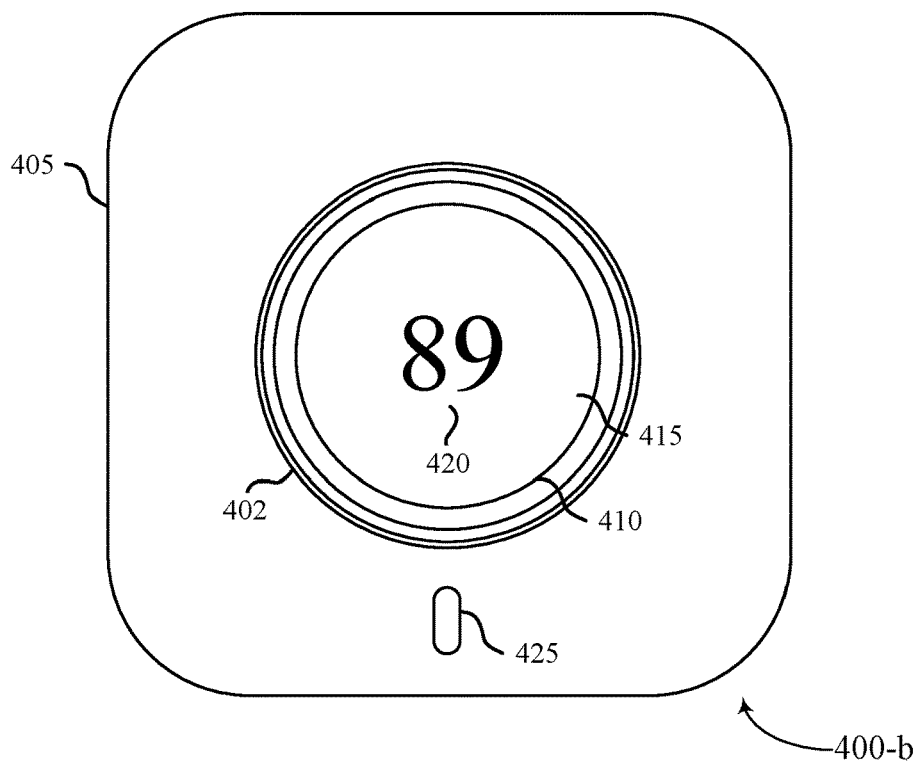

FIGS. 4A and 4B show examples of a charging diagram 400-a and a charging diagram 400-b that support a wearable device charger with a display in accordance with aspects of the present disclosure. The charging diagrams 400 illustrate examples of a wearable devices 402 (e.g., a ring, a bracelet, or another device) and a charging device 405, as described herein with reference to FIGS. 1 through 3. Although the charging diagrams 400 are illustrated with the wearable device 402 mounted onto the charging device 405, the described techniques may be used with the wearable device 402 in an unmounted state (e.g., being worn by a user of the wearable device 402).

The charging diagrams 400 illustrate various potential implementations of a display component 415 of the charging device 405 which may be configured to display physiological information 420 associated with the user (e.g., breathing rate, temperature, heart rate, one or more Scores identifying physiological determinations associated with the user) or data related to a feature of an application on a smart device (e.g., graphics related to breathing exercises). The charging device 405 illustrated in FIGS. 4A and 4B may be an example of the charger base 305 illustrated in FIG. 3. Similarly, the display component 415 illustrated in FIGS. 4A and 4B may be an example of the display system 350 illustrated in FIG. 3.

In some examples, the charging device 405 may include a base and a support 410 (also referred to herein as a post or mounting portion), and the wearable device 402 may be configured to charge when positioned against the support 410 of the charging device 405. For example, the support 410 and the wearable device 402 may have one or more charging components (e.g., inductive or contact-based charging components), such that a rechargeable battery of the wearable device 402 is configured to charge when the charging components of the wearable device 402 are within a threshold distance or are in physical contact with one of the charging components of the charging device 405 (e.g., within the support 410). In some examples, the support 410 may include one or more indentations or protrusions that are configured to interface with one or more "domes" or indentations of the wearable device 402 when the wearable device 402 is placed onto the charging device 405. In some examples, the display component 415 may be located on a top surface of the support 410 or in a different position on the surface of the charging device 405.

In some aspects, the charging device 405 may include a communication module that may receive physiological data or data related to an application feature or other graphics (e.g., graphics for breathing exercises or the like) via Bluetooth from a smart device, such as a smartphone or from the wearable device 402. The physiological data may be data collected from the user via the wearable device 402 (e.g., using one or more sensors of the wearable device 402, as described with reference to FIGS. 1-3). In some examples, the charging device 405 may receive the physiological data or application feature data in response to a command from the user (e.g., a command input into the application of the smart device). In some examples, the charging device 405 may receive the physiological data or application feature data automatically (e.g., when the wearable device 402 or the smart device is within a threshold distance from the charging device 405, when the wearable device 402 is placed onto the charging device 405, when the wearable device is removed from the charging device 405) or in response to satisfaction of a trigger condition. The charging device 405 may accordingly display the physiological information 420 via the display component 415 such that the user may view the physiological information 420 without use of the smart device.

In some examples, the charging device 405 (e.g., or the smart device or wearable device 402) may identify one or more trigger conditions for the charging device 405 to receive and/or begin to display the information 420. For example, the user may input one or more commands (e.g., user preferences) into the smart device application for the charging device 405 to display the information 420. The one or more commands may include one or more types of information to be displayed (e.g., heart rate, Sleep Score, Readiness Score, Activity Score, breathing or respiration rate, temperature, application feature data), one or more trigger conditions for the charging device 405 to begin to display the information 420 charging device 405 charging device 405 charging device 405, and/or an association between the one or more types of information and the one or more triggers conditions.

As it is used herein, the term "trigger condition" may be used to refer to one or more parameters or circumstances that, if satisfied, cause the display component 415 to display a certain type of information associated with the trigger condition. For example, a trigger condition may be satisfied based on a change of state of the user, such as the user waking up, falling asleep, beginning to exercise, or completing a workout. In other cases, a trigger condition may be satisfied based on the user selecting an option on the application to begin displaying the data, or based on a voice or gesture command from the user (e.g., gesture identified based on motion data collected via the wearable device 402). In other cases, a trigger condition may be satisfied based on the user placing the wearable device 402 onto the charging device 405 or removing the wearable device 402 from the charging device 405. In other cases, a trigger condition may be satisfied at specified times of the day (e.g., display information X between 9:00 am and 11:00 am, display information Y between 6:00 pm and 9:00 pm). In yet other cases, trigger conditions may be satisfied based on the user's location (e.g., trigger condition satisfied when the user enters a threshold distance from the charging device 405).

For example, the user may input one or more preferences into the smart device application to trigger the charging device 405 to begin to display a Sleep Score or a Readiness Score associated with the user upon detecting that the user has awoken or at a certain time of day. In this regard, the user may define different "trigger conditions" that cause the display component 415 to display certain types of data/information based on the satisfaction of the respective trigger conditions. For instance, charging device 405 the system (e.g., charger device 405) may identify a satisfaction of a first trigger condition based on detecting that the user is performing or has ended a workout, and may cause the display component 415 to display a heart rate, respiration rate, or Activity Score associated with the user based on the satisfaction of the first trigger condition. By way of another example, the system (e.g., charger device 405) may identify a satisfaction of a second trigger condition based on the current time falling within a given time range (e.g., the current time being within a range of the user's normal bedtime), and may cause the display component 415 to charging device 405 display a information associated a meditation exercise and/or the user's breathing rate based on the satisfaction of the second trigger condition (e.g., to assist the user in falling asleep). By way of another example, the system (e.g., charger device 405) may identify a satisfaction of a third trigger condition based on identifying a charging procedure of the wearable device 402, and may cause the display component 415 to display the battery level of the wearable device 402 based on the satisfaction of the third trigger condition.

In some examples, the display component 415 may display charging device 405 graphics related to breathing exercises upon satisfaction of an applicable trigger condition (e.g., based on the user initiating a meditation feature in the smart device application, or based on physiological data indicating that the user is struggling to fall asleep). To display the graphics, the system may determine the user's current respiration rate, and may charging device 405 determine a respiration rate pattern (e.g., a recommended respiration rate pattern associated with an artificial respiration rate lower than the actual/current respiration rate of the user). The charging device 405 may accordingly generate the graphics related to the breathing exercises based on the respiration rate pattern. In some examples, the graphics may indicate a recommended inhalation pattern and exhalation pattern for the user. In this regard, the graphics displayed by the display component 415 may help the user to slow their respiration rate, thereby helping the user relax, reduce stress, and fall asleep.

In some examples, the wearable device 402, or the smart device (e.g., user device 106), and/or charger device (e.g., charging device 405) may determine that one or more trigger conditions have been satisfied (e.g., based on receiving user input on the application or based on measuring one or more physiological parameters of the user). The wearable device 402 or the smart device may accordingly transmit the information 420 and a command to the charging device 405 to begin to display the information 420. In some examples, the charging device 405 may determine satisfaction of a trigger condition autonomously. For example, the charging device 405 may be configured to estimate a distance between the charger base and the user (e.g., using one or more signals exchanged between the devices). The charging device 405 may determine satisfaction of the trigger condition based on the estimated distance being less than or equal to a threshold distance. The charging device 405 may determine that the trigger condition has been satisfied and may identify the information 420 to be displayed in response to the determining (e.g., by communicating one or more signals with the wearable device 402 or the smart device). The charging device 405 may transmit a signal to the display component 415 to cause the display component 415 to begin to display the information 420.

In some examples, the charging device 405 may display more than one type of information 420 (e.g., in response to the satisfaction of one or more trigger conditions). For example, the charging device 405 may determine that a first trigger condition has been satisfied at a first time of day, and may determine that a second trigger condition is satisfied at a second time of day. The charging device 405 may accordingly display a first type of information 420 throughout the first time of day (e.g., between 9:00 am and 11:00 am) and a second type of information 420 throughout the second time of day (e.g., between 5:00 pm and 10:00 pm).

In additional or alternative cases where multiple trigger conditions are satisfied at the same time, the display component 415 may be configured to display multiple types of information 420 simultaneously. For example, the display component 415 may be configured to display a Sleep Score for the user based on identifying that the user has awoken (e.g., satisfaction of a first trigger condition). Subsequently, the system (e.g., wearable device 402, charging device 405, user device 106, servers 110) may identify that the user has started a workout (e.g., of a first trigger condition). In this example, the display component 415 may adjust the information 420/data presented to the user based on the satisfaction of multiple trigger conditions. For instance, the display component 415 may be adjusted to display a first type of information 420 (e.g., Sleep Score) in response to satisfaction of the first trigger condition (e.g., the user waking up), and second type of information 420 (e.g., heart rate, respiration rate, Activity Score, etc.) in response to satisfaction of the second trigger condition (e.g., the user starting a workout).

In some cases, the user may be able to define certain rules or conditions that control whether the display component 415 is to display multiple types of information based on the satisfaction of multiple trigger conditions, or whether a satisfaction of a new trigger condition causes the display component 415 to display a new type of information 420 (e.g., a newly-satisfied trigger condition "trumps" a trigger condition that was satisfied previously). In other cases, the behavior of the display component 415 (e.g., what type of information 420 is displayed) may be based on a temporal relationship between the satisfaction of multiple trigger conditions (e.g., trigger condition #2 satisfied within X time of trigger condition #1 being satisfied). For instance, the display component 415 may be configured to display two types of information 420 associated with two different trigger conditions only if the trigger conditions are satisfied within one hour of one another. Conversely, if the two trigger conditions are satisfied more than one hour apart, the display component 415 may be configured to "replace" the first type of information 420 associated with the earlier-satisfied trigger condition with the second type of information 420 associated with the later-satisfied trigger condition.

In some examples, the charging device 405 may receive the physiological data or application feature data in real time (e.g., from the wearable device 402 or from the smart device), where the received physiological data is evaluated to identify the satisfaction of the respective trigger conditions. For example, if the charging device 405 is triggered to display a heart or breathing rate associated with the user, the charging device 405 may receive real-time updates of the heart or breathing rate data (e.g., measured by the wearable device 402) to display accurate and up to date information 420 via the display component 415. If the charging device 405 is triggered to display graphics related to breathing exercises, the charging device 405 may receive real-time updates to the respiration rate or displayed graphics to account for real-time changes in the breathing rate of the user (e.g., measured by the wearable device 402). The charging device 405 may receive the real-time updates to the information 420 from the wearable device 402 or from the smart device, for example, via Bluetooth or other wireless communication protocol.

As illustrated with reference to the charging diagram 400-a in FIG. 4A, in some examples, the display component 415 may project the information 420 above the charging device 405. For example, the display component 415 may be an example of an autostereoscopic (e.g., or holographic) display. That is, the display component 415 may include one or more high-density arrays of light emitting features (e.g., a high-resolution LED or OLED matrix display) and one or more optical lenses coupled with the arrays of light emitting features to generate a "light field 430" above the charging device 405. In some examples, a first portion of the light field 430 that is viewable by the user in a right eye of the user may be different from a second portion of the light field 430 that is viewable by the user in a left eye of the user. Accordingly, the user may perceive the light field 430 as a three-dimensional display of projected information 420 in the air above the charging device 405 (e.g., binocular perception of three-dimensional depth) without using the smart device application to view the information 420.

In some examples, the display component 415 may generate the first portion and the second portion of the light field 430 such that the projected information 420 is viewable by the user from a single viewing angle. In some examples, the display component 415 may generate multiple first portions and multiple second portions of the light field 430 such that the projected information 420 is viewable by the user from multiple viewing angles (e.g., from any viewing angle). In some examples, the display component 415 may include optical components (e.g., lenticular lenses, integral optics with a micro-lens matrix, parallax barriers) to direct the first portion and the second portion of the light field 430 into a first viewing region and a second viewing region (e.g., for the right eye and for the left eye, respectively).

In some aspects, the display component 415 may project the information 420 onto a surface (e.g., a ceiling, a wall) around the charging device 405. For example, the display component 415 may include one or more light emitting components (e.g., LEDs, OLEDs, or an LCD) and an optical lens. The charging device 405 may accordingly project the information 420 through the optical lens via the light emitting components. Accordingly, the user may view the information 420 on the surface (e.g., the ceiling or wall) rather than using the smart device application to view the information 420.

As illustrated with reference to the charging diagram 400-b in FIG. 4B, in some examples, the display component 415 may include one or more light components (e.g., LEDs, OLEDs, an LCD) to form a viewing screen on a surface of the charging device 405. For example, the user may view the information 420 by looking at the surface of the charging device 405 (e.g., on the top surface of the support 410). Accordingly, the user may view the information 420 without using the smart device application. Such techniques may increase overall health, sleep quality, and satisfaction of the user by decreasing an amount of time spent interacting with the smart device.

The display component 415 may be any color combination of light components (e.g., red, blue, green, etc.), and there may include any quantity of light components in the display component 415. In some examples, the user may select one or more display preferences (e.g., display color, display brightness, display size, and the like). For example, the user may input the one or more display preferences into the smart device application. The smart device may accordingly transmit an indication of the display preferences to the charging device 405 (e.g., via Bluetooth) to cause the charging device 405 to adjust the display component 415 in accordance with the display preferences.

In some cases, the charging device 405 may include an indicating light 425 (e.g., an LED or similar light emitting component). The indicating light 425 may display one or more indications to a user of the wearable device 402. For example, the indicating light 425 may display a battery level of the wearable device 402, a battery health/charge status (e.g., end of battery life), a time of day, or connectivity issues. Additionally, or alternatively, the indicating light 425 may display one or more alerts to the user (e.g., action items prompting the user to perform an action, and the like). The indicating light 425 may be any color combination (e.g., red LED, blue LED, green LED), and there may include any quantity of LEDs.

It should be noted that the methods described above describe possible implementations, and that the operations and the steps may be rearranged or otherwise modified and that other implementations are possible. Furthermore, aspects from two or more of the methods may be combined.

A method by an apparatus is described. The method may include a base configured to receive a wearable device, the wearable device configured to acquire physiological data from a user, a charging component configured to transfer power through the base to the wearable device to charge a rechargeable battery of the wearable device, a display component configured to display information to the user, one or more processors communicatively coupled with the charging component, the display component, or both, the one or more processors configured to, receive the physiological data acquired from the user via the wearable device, identify a satisfaction of one or more trigger conditions for displaying information to the user based at least in part on the received physiological data, a location of the user relative to the charging device, or both, identify one or more types of information to be displayed to the user based at least in part on the satisfaction of the one or more trigger conditions, wherein the one or more types of information comprise one or more physiological parameters included within the physiological data, one or more physiological determinations based on the physiological data, or both, and transmit a signal to the display component to cause the display component of the charging device to display the one or more types of information based at least in part on the satisfaction of the one or more trigger conditions.

An apparatus is described. The apparatus may include one or more memories storing processor executable code, and one or more processors coupled with the one or more memories. The one or more processors may individually or collectively operable to execute the code to cause the apparatus to a base configure to receive a wearable device, the wearable device configured to acquire physiological data from a user, a charge component configured to transfer power through the base to the wearable device to charge a rechargeable battery of the wearable device, a display component configure to display information to the user, one or more processors communicatively couple with the charging component, the display component, or both, the one or more processors configured to, receive the physiological data acquired from the user via the wearable device, identify a satisfaction of one or more trigger conditions for displaying information to the user based at least in part on the received physiological data, a location of the user relative to the charging device, or both, identify one or more types of information to be displayed to the user based at least in part on the satisfaction of the one or more trigger conditions, wherein the one or more types of information comprise one or more physiological parameters included within the physiological data, one or more physiological determinations based on the physiological data, or both, and transmit a signal to the display component to cause the display component of the charging device to display the one or more types of information based at least in part on the satisfaction of the one or more trigger conditions.

Another apparatus is described. The apparatus may include means for a base configured to receive a wearable device, the wearable device configured to acquire physiological data from a user, means for a charging component configured to transfer power through the base to the wearable device to charge a rechargeable battery of the wearable device, means for a display component configured to display information to the user, means for one or more processors communicatively coupled with the charging component, the display component, or both, the one or more processors configured to, means for receive the physiological data acquired from the user via the wearable device, means for identify a satisfaction of one or more trigger conditions for displaying information to the user based at least in part on the received physiological data, a location of the user relative to the charging device, or both, means for identify one or more types of information to be displayed to the user based at least in part on the satisfaction of the one or more trigger conditions, wherein the one or more types of information comprise one or more physiological parameters included within the physiological data, one or more physiological determinations based on the physiological data, or both, and means for transmit a signal to the display component to cause the display component of the charging device to display the one or more types of information based at least in part on the satisfaction of the one or more trigger conditions.

A non-transitory computer-readable medium storing code is described. The code may include instructions executable by one or more processors to a base configure to receive a wearable device, the wearable device configured to acquire physiological data from a user, a charge component configured to transfer power through the base to the wearable device to charge a rechargeable battery of the wearable device, a display component configure to display information to the user, one or more processors communicatively couple with the charging component, the display component, or both, the one or more processors configured to, receive the physiological data acquired from the user via the wearable device, identify a satisfaction of one or more trigger conditions for displaying information to the user based at least in part on the received physiological data, a location of the user relative to the charging device, or both, identify one or more types of information to be displayed to the user based at least in part on the satisfaction of the one or more trigger conditions, wherein the one or more types of information comprise one or more physiological parameters included within the physiological data, one or more physiological determinations based on the physiological data, or both, and transmit a signal to the display component to cause the display component of the charging device to display the one or more types of information based at least in part on the satisfaction of the one or more trigger conditions.

In some examples of the method, apparatus, and non-transitory computer-readable medium described herein, satisfaction of a first trigger condition causes the display component to display a first type of information associated with the physiological data and satisfaction of a second trigger condition causes the display component to display a second type of information associated with the physiological data.

Some examples of the method, apparatus, and non-transitory computer-readable medium described herein may further include operations, features, means, or instructions for determine that the user may have woken up based at least in part on the physiological data received from the wearable device, wherein identifying the satisfaction of the one or more trigger conditions may be based at least in part on determining that the user may have awoken.

Some examples of the method, apparatus, and non-transitory computer-readable medium described herein may further include operations, features, means, or instructions for identify a Sleep Score, a Readiness Score, or both, associated with the user based at least in part on determining that the user may have awoken, wherein the one or more types of information to be displayed via the display component comprise the Sleep Score, the Readiness Score, or both.

Some examples of the method, apparatus, and non-transitory computer-readable medium described herein may further include operations, features, means, or instructions for determine that the user may be performing a workout, may have completed the workout, or both, wherein identifying the satisfaction of the one or more trigger conditions may be based at least in part on determining that the user may be performing the workout, may have completed the workout, or both, and wherein the one or more types of information to be displayed via the display component comprise an Activity Score, a heart rate, a respiration rate, or any combination thereof.

Some examples of the method, apparatus, and non-transitory computer-readable medium described herein may further include operations, features, means, or instructions for receive one or more signals from the wearable device and estimate a distance between the charging device and the user based at least in part on the one or more signals, wherein the satisfaction of the one or more trigger conditions may be based at least in part on the distance being less than or equal to a threshold distance.

Some examples of the method, apparatus, and non-transitory computer-readable medium described herein may further include operations, features, means, or instructions for identify a charging procedure between the charging component and the wearable device, wherein identifying the satisfaction of the one or more trigger conditions may be based at least in part on identifying the charging procedure, and wherein the one or more types of information to be displayed via the display component comprise a battery level of the wearable device.

In some examples of the method, apparatus, and non-transitory computer-readable medium described herein, a first trigger condition may be satisfied during a first time period during a day, a second trigger condition may be satisfied during a second time period during the day, satisfaction of the first trigger condition causes the display component to display a first type of information associated with the physiological data, and satisfaction of the second trigger condition causes the display component to display a second type of information associated with the physiological data.

Some examples of the method, apparatus, and non-transitory computer-readable medium described herein may further include operations, features, means, or instructions for receive one more user inputs indicating an association between a first trigger condition of the one or more trigger conditions and a first type of information included within the one or more types of information, wherein the signal instructs the display component to display the first type of information based at least in part on the satisfaction of the first trigger condition and the association between the first trigger condition and the first type of information.

In some examples of the method, apparatus, and non-transitory computer-readable medium described herein, and the method, apparatuses, and non-transitory computer-readable medium may include further operations, features, means, or instructions for determine a respiration rate pattern associated with the user based at least in part on the respiration rate, wherein the respiration rate pattern may be associated with an artificial respiration rate that may be lower than the respiration rate, and wherein the one or more types of information comprise the respiration rate pattern.

In some examples of the method, apparatus, and non-transitory computer-readable medium described herein, the respiration rate pattern comprises an inhalation pattern and an exhalation pattern and the signal causes the display component of the charging device to display the inhalation pattern and the exhalation pattern.

In some examples of the method, apparatus, and non-transitory computer-readable medium described herein, the display component comprises an LCD, a holographic display, a display comprising a plurality of LEDs, a display comprising a plurality of OLEDs, or any combination thereof.

In some examples of the method, apparatus, and non-transitory computer-readable medium described herein, the display component comprises an autostereoscopic display configured to project a plurality of images to display the one or more types of information.

In some examples of the method, apparatus, and non-transitory computer-readable medium described herein, the display component may be configured to project images associated with the one or more types of information onto a wall, a ceiling, another surface, or any combination thereof.

A method by an apparatus is described. The method may include receiving physiological data acquired from a user via a wearable device, identifying a satisfaction of one or more trigger conditions for displaying information to the user based at least in part on the received physiological data, a location of the user relative to a charging device, or both, identifying one or more types of information to be displayed to the user based at least in part on the satisfaction of the one or more trigger conditions, wherein the one or more types of information comprise one or more physiological parameters included within the physiological data, one or more physiological determinations based on the physiological data, or both, and transmitting a signal to a display component of the charging device to cause the display component of the charging device to display the one or more types of information based at least in part on the satisfaction of the one or more trigger conditions.

An apparatus is described. The apparatus may include one or more memories storing processor executable code, and one or more processors coupled with the one or more memories. The one or more processors may individually or collectively operable to execute the code to cause the apparatus to receive physiological data acquired from a user via a wearable device, identify a satisfaction of one or more trigger conditions for displaying information to the user based at least in part on the received physiological data, a location of the user relative to a charging device, or both, identify one or more types of information to be displayed to the user based at least in part on the satisfaction of the one or more trigger conditions, wherein the one or more types of information comprise one or more physiological parameters included within the physiological data, one or more physiological determinations based on the physiological data, or both, and transmit a signal to a display component of the charging device to cause the display component of the charging device to display the one or more types of information based at least in part on the satisfaction of the one or more trigger conditions.

Another apparatus is described. The apparatus may include means for receiving physiological data acquired from a user via a wearable device, means for identifying a satisfaction of one or more trigger conditions for displaying information to the user based at least in part on the received physiological data, a location of the user relative to a charging device, or both, means for identifying one or more types of information to be displayed to the user based at least in part on the satisfaction of the one or more trigger conditions, wherein the one or more types of information comprise one or more physiological parameters included within the physiological data, one or more physiological determinations based on the physiological data, or both, and means for transmitting a signal to a display component of the charging device to cause the display component of the charging device to display the one or more types of information based at least in part on the satisfaction of the one or more trigger conditions.

A non-transitory computer-readable medium storing code is described. The code may include instructions executable by one or more processors to receive physiological data acquired from a user via a wearable device, identify a satisfaction of one or more trigger conditions for displaying information to the user based at least in part on the received physiological data, a location of the user relative to a charging device, or both, identify one or more types of information to be displayed to the user based at least in part on the satisfaction of the one or more trigger conditions, wherein the one or more types of information comprise one or more physiological parameters included within the physiological data, one or more physiological determinations based on the physiological data, or both, and transmit a signal to a display component of the charging device to cause the display component of the charging device to display the one or more types of information based at least in part on the satisfaction of the one or more trigger conditions.

In some examples of the method, apparatus, and non-transitory computer-readable medium described herein, satisfaction of a first trigger condition causes the display component to display a first type of information associated with the physiological data and satisfaction of a second trigger condition causes the display component to display a second type of information associated with the physiological data.

Some examples of the method, apparatus, and non-transitory computer-readable medium described herein may further include operations, features, means, or instructions for determining that the user may have woken up based at least in part on the physiological data received from the wearable device, wherein identifying the satisfaction of the one or more trigger conditions may be based at least in part on determining that the user may have awoken.

Some examples of the method, apparatus, and non-transitory computer-readable medium described herein may further include operations, features, means, or instructions for identifying a Sleep Score, a Readiness Score, or both, associated with the user based at least in part on determining that the user may have awoken, wherein the one or more types of information to be displayed via the display component comprise the Sleep Score, the Readiness Score, or both.

Some examples of the method, apparatus, and non-transitory computer-readable medium described herein may further include operations, features, means, or instructions for determining that the user may be performing a workout, may have completed the workout, or both, wherein identifying the satisfaction of the one or more trigger conditions may be based at least in part on determining that the user may be performing the workout, may have completed the workout, or both, and wherein the one or more types of information to be displayed via the display component comprise an Activity Score, a heart rate, a respiration rate, or any combination thereof.

Some examples of the method, apparatus, and non-transitory computer-readable medium described herein may further include operations, features, means, or instructions for receiving one or more signals from the wearable device and estimating a distance between the charging device and the user based at least in part on the one or more signals, wherein the satisfaction of the one or more trigger conditions may be based at least in part on the distance being less than or equal to a threshold distance.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A charging device, comprising:
   a base configured to receive a wearable device, the wearable device configured to acquire physiological data from a user;
   a charging component configured to transfer power through the base to the wearable device to charge a rechargeable battery of the wearable device;
   a display component configured to display information to the user; and
   one or more processors communicatively coupled with the charging component, the display component, or both, the one or more processors configured to:
   receive the physiological data acquired from the user via the wearable device;
   identify a satisfaction of one or more trigger conditions for displaying information to the user based at least in part on the received physiological data, a location of the user relative to the charging device, or both;
   identify one or more types of information to be displayed to the user based at least in part on the satisfaction of the one or more trigger conditions, wherein the one or more types of information comprise one or more physiological parameters included within the physiological data, one or more physiological determinations based on the physiological data, or both; and
   transmit a signal to the display component to cause the display component of the charging device to display the one or more types of information based at least in part on the satisfaction of the one or more trigger conditions.

2. The charging device of claim 1, wherein satisfaction of a first trigger condition causes the display component to display a first type of information associated with the physiological data, and wherein satisfaction of a second trigger condition causes the display component to display a second type of information associated with the physiological data.

3. The charging device of claim 1, wherein the one or more processors are further configured to:
   determine that the user has awoken based at least in part on the physiological data received from the wearable device, wherein identifying the satisfaction of the one or more trigger conditions is based at least in part on determining that the user has awoken.

4. The charging device of claim 3, wherein the one or more processors are further configured to:
   identify a Sleep Score, a Readiness Score, or both, associated with the user based at least in part on determining that the user has awoken, wherein the one or more types of information to be displayed via the display component comprise the Sleep Score, the Readiness Score, or both.

5. The charging device of claim 1, wherein the one or more processors are further configured to:
   determine that the user is performing a workout, has completed the workout, or both, wherein identifying the satisfaction of the one or more trigger conditions is based at least in part on determining that the user is performing the workout, has completed the workout, or both, and wherein the one or more types of information to be displayed via the display component comprise an Activity Score, a heart rate, a respiration rate, or any combination thereof.

6. The charging device of claim 1, wherein the one or more processors are further configured to:
receive one or more signals from the wearable device; and
estimate a distance between the charging device and the user based at least in part on the one or more signals, wherein the satisfaction of the one or more trigger conditions is based at least in part on the distance being less than or equal to a threshold distance.

7. The charging device of claim 1, wherein the one or more processors are further configured to:
identify a charging procedure between the charging component and the wearable device, wherein identifying the satisfaction of the one or more trigger conditions is based at least in part on identifying the charging procedure, and wherein the one or more types of information to be displayed via the display component comprise a battery level of the wearable device.

8. The charging device of claim 1, wherein a first trigger condition is satisfied during a first time period during a day, and wherein a second trigger condition is satisfied during a second time period during the day, wherein satisfaction of the first trigger condition causes the display component to display a first type of information associated with the physiological data, and wherein satisfaction of the second trigger condition causes the display component to display a second type of information associated with the physiological data.

9. The charging device of claim 1, wherein the one or more processors are further configured to:
receive one more user inputs indicating an association between a first trigger condition of the one or more trigger conditions and a first type of information included within the one or more types of information, wherein the signal instructs the display component to display the first type of information based at least in part on the satisfaction of the first trigger condition and the association between the first trigger condition and the first type of information.

10. The charging device of claim 1, wherein the physiological data comprises respiration rate data associated with a respiration rate of the user, wherein the one or more processors are further configured to:
determine a respiration rate pattern associated with the user based at least in part on the respiration rate, wherein the respiration rate pattern is associated with an artificial respiration rate that is lower than the respiration rate, and wherein the one or more types of information comprise the respiration rate pattern.

11. The charging device of claim 10, wherein the respiration rate pattern comprises an inhalation pattern and an exhalation pattern, wherein the signal causes the display component of the charging device to display the inhalation pattern and the exhalation pattern.

12. The charging device of claim 1, wherein the display component comprises a liquid crystal display, a holographic display, a display comprising a plurality of light-emitting diodes, a display comprising a plurality of organic light-emitting diodes, or any combination thereof.

13. The charging device of claim 1, wherein the display component comprises an autostereoscopic display configured to project a plurality of images to display the one or more types of information.

14. The charging device of claim 1, wherein the display component is configured to project images associated with the one or more types of information onto a wall, a ceiling, another surface, or any combination thereof.

15. A method, comprising:
receiving physiological data acquired from a user via a wearable device;
identifying a satisfaction of one or more trigger conditions for displaying information to the user based at least in part on the received physiological data, a location of the user relative to a charging device, or both;
identifying one or more types of information to be displayed to the user based at least in part on the satisfaction of the one or more trigger conditions, wherein the one or more types of information comprise one or more physiological parameters included within the physiological data, one or more physiological determinations based on the physiological data, or both; and
transmitting a signal to a display component of the charging device to cause the display component of the charging device to display the one or more types of information based at least in part on the satisfaction of the one or more trigger conditions.

16. The method of claim 15, wherein satisfaction of a first trigger condition causes the display component to display a first type of information associated with the physiological data, and wherein satisfaction of a second trigger condition causes the display component to display a second type of information associated with the physiological data.

17. The method of claim 15, further comprising:
determining that the user has woken up based at least in part on the physiological data received from the wearable device, wherein identifying the satisfaction of the one or more trigger conditions is based at least in part on determining that the user has awoken.

18. The method of claim 17, further comprising:
identifying a Sleep Score, a Readiness Score, or both, associated with the user based at least in part on determining that the user has awoken, wherein the one or more types of information to be displayed via the display component comprise the Sleep Score, the Readiness Score, or both.

19. The method of claim 15, further comprising:
determining that the user is performing a workout, has completed the workout, or both, wherein identifying the satisfaction of the one or more trigger conditions is based at least in part on determining that the user is performing the workout, has completed the workout, or both, and wherein the one or more types of information to be displayed via the display component comprise an Activity Score, a heart rate, a respiration rate, or any combination thereof.

20. The method of claim 15, further comprising:
receiving one or more signals from the wearable device; and
estimating a distance between the charging device and the user based at least in part on the one or more signals, wherein the satisfaction of the one or more trigger conditions is based at least in part on the distance being less than or equal to a threshold distance.

* * * * *